United States Patent

[11] 3,614,028

| [72] | Inventor | Harold F. Kleckner<br>Pacific Palisades, Calif. |
|---|---|---|
| [21] | Appl. No. | 2,109 |
| [22] | Filed | Jan. 12, 1970 |
| [45] | Patented | Oct. 19, 1971 |
| [73] | Assignee | McDonnell Douglas Corporation |

[54] TURBOFAN-POWERED STOL AIRCRAFT
11 Claims, 7 Drawing Figs.

| [52] | U.S. Cl. | 244/15, 244/42 DA, 244/54 |
|---|---|---|
| [51] | Int. Cl. | B64d 27/18 |
| [50] | Field of Search | 244/12, 15, 23, 42, 53, 54 |

[56] References Cited
UNITED STATES PATENTS

| 2,908,454 | 10/1959 | De Wolff | 244/42.62 |
| 3,312,426 | 4/1967 | Fowler | 244/12 D |
| 3,434,679 | 3/1969 | Kutney et al. | 244/53 |
| 3,478,988 | 11/1969 | Röed | 244/12 D |

*Primary Examiner*—Milton Buchler
*Assistant Examiner*—Steven W. Weinrieb
*Attorneys*—Walter J. Jason, Donald L. Royer and Robert O. Richardson ABSTRACT: A short takeoff and landing (STOL) aircraft employing turbofan engines and a wing and flap arrangement to provide propulsive lift, a high lift capability, and a steeper landing approach flight path. Improvements in these characteristics are achieved by a particular positioning of the engine fan and primary exhaust efflux flow relative to the wing and by locating the flaps for operation in consort with the engine-derived gaseous flow and the wing.

PATENTED OCT 19 1971 3,614,028

INVENTOR.
HAROLD F. KLECKNER
BY Robert O. Richardson
- ATTORNEY -

INVENTOR.
HAROLD F. KLECKNER
BY Robert O. Richardson
— ATTORNEY —

INVENTOR.
HAROLD F. KLECKNER
BY Robert O. Richardson
- ATTORNEY.

TURBOFAN-POWERED STOL AIRCRAFT

BACKGOUND OF THE INVENTION

There is a continuous need for military and commercal aircraft that require shorter takeoff and landing distances than present-day airplanes. This need is fulfilled by creating an aircraft configuration which will achieve the short takeoff and landing distances while retaining the basic reliability, speed, and comfort of present-day airplanes.

When a takeoff and landing distance requirement is as short as 1,000 to 2,000 feet, airplanes that meet the requirement are popularly categorized as STOL for Short Takeoff and Landing. Relative to conventional aircraft, STOL aircraft require a higher ratio of thrust to takeoff weight, a higher lifting ability, and a steeper flight path after takeoff and in the landing approach. STOL aircraft, therefore, normally use propulsive lift, i.e., lift derived from the engines, to augment the basic lifting ability of the wing. It is the manner of obtaining the propulsive lift that is the differentiation among STOL airplane concepts.

Some STOL airplanes are turboprops wherein flap deflection is used to redirect the propeller slipstream to obtain propulsive lift. These airplanes have the disadvantages of high interior noise and high vibration levels that stem from the propeller and which are aggravated by the higher power required for STOL. In addition, a flap is inefficient in redirecting the slipstream behind a large propeller, and the flap alone is incapable of providing both high propulsive lift and the desired steep landing approach flight path. Turboprop aircraft are slower than turbofan aircraft and have higher maintenance costs. Hence, a turboprop STOL airplane is less preferable than a turbofan STOL airplane.

Many other concepts have been proposed to achieve STOL performance. Two known concepts utilize turbofan engines for cruise and thus do not suffer the slow cruise speed penalty of the turboprop. Turbofan engines are those which derive part of their thrust from a multiple bladed fan and part from the primary jet exhaust. These two concepts, however, do have disadvantages. The first of the two concepts obtains the added lifting ability for STOL by utilizing separate lifting engines installed in the fuselage. This concept suffers the penalties associated with additional power plant installations including added cost, complexity, maintenance, and noise. The second of the two concepts obtains additional lifting ability from separate lifting fans integrated into the wing. This concept suffers many of the same penalties as the first, namely added cost, complexity, and maintenance.

The transition from propeller-driven aircraft to turbojet and now refined to turbofan-powered aircraft was prompted by the great reliability of the turbine engines, the high speeds at high altitude they provide, and the low interior noise and vibration levels. The challenge in STOL aircraft is the achievement of the STOL capability with turbofan engines in order that the advantages that accrue with turbofan engines are not lost while gaining the advantages of STOL operations. It is this challenge which the present invention has met.

SUMMARY OF THE PRESENT INVENTION

A STOL airplane has been evolved that operates in the manner of conventional airplanes and does not sacrifice the speed, reliability, and comfort of modern jet-powered aircraft. This is accomplished by combining turbofan engines and the elements of the airframe in a unique way to achieve a high lifting capability, good airplane handling and control, structural and design simplicity, engine accessibility, and low maintenance.

The high lifting capability of the aricraft comprising the present invention results from two things: first, a high lift wing and flap design and second, high propulsive lift resulting from a unique engine-wing relationship. The wing and flap design herein described incorporates advancements in airfoil and flap shaping and flap placement which result in a maximum lift capability among the highest known. The propulsive lift, which can be as great or greater than the basic lift of the wing and flap, is due in part to the engine exhaust being redirected by the flap (reaction lift) and in part due to added lift induced on the wing from the high-velocity engine exhaust passing over and under the wing (induced lift). The high-velocity engine exhaust acts similar to a large chord extension of the wing and flap. The elements of the airplane are combined in a way to maximize the total lifting capability consistent with other design constraints. The high lifting capability is obtained without the complexity of internal ducting which is present in many STOL airplane lifting systems.

Good airplane handling and control are provided through the use of large, power-operated control surfaces which provide adequate control down to minimum airspeeds including the situation where an outboard engine becomes inoperative. The engine placement is such as to facilitate engine-out control. Augmentation by the use of boundary layer control may be used depending on detail airplane requirements. Airplane handling is enhanced by the lifting system in that a steeper flight path in the landing approach can be achieved with the engine/wing/flap arrangement of the present invention without sacrificing propulsive lift. This characteristic results from redirecting the engine exhaust to give the desired longitudinal component of thrust rather than having to use a device to increase the drag which represents a penalty. Airplane handling is further enhanced through the use of direct lift and direct drag controls. Direct lift control is achieved with wing spoilers from a biased up position through a separate control or in conjunction with elevator control or both depending on detail requirements. Direct drag control is achieved with an auxiliary flap which provides a change in drag with no essential change in lift. Direct lift control provides a reduction of vertical sink rate while approaching the ground without change of airplane attitude or throttle setting. Direct drag control provides a change in glide slope without change of airplane attitude or throttle setting.

Structural and design simplicity result from the manner in which the major elements of the airplane are combined. This combination of elements also provides good engine accessibility and low maintenance. The engines are located externally to the wing in separate nacelles. Although similar in their manner of being attached in place to that of many present-day airplanes, the engines are uniquely positioned to attain the high lifting capability discussed previously. The engine position provides the easy engine access of current airplanes with a corresponding low maintenance compared to engines buried in the fuselage or wing and to other unusual engine installations that have been proposed for STOL aircraft. At the same time the wing and flap structure is comparable to that of current airplanes as are the control elements. A heat shield may be required in the area directly behind the engine primary exhaust. The engine fan air of the present aircraft, however, effectively protects the wing lower surface from the engine primary exhaust temperatures.

BRIEF DESCRIPTION OF DRAWINGS

FIG. 5 is a schematic illustration of the air flow over the wing and flaps;

DESCRIPTION OF ILLUSTRATIVE EMBODIMENT

Figure 1:
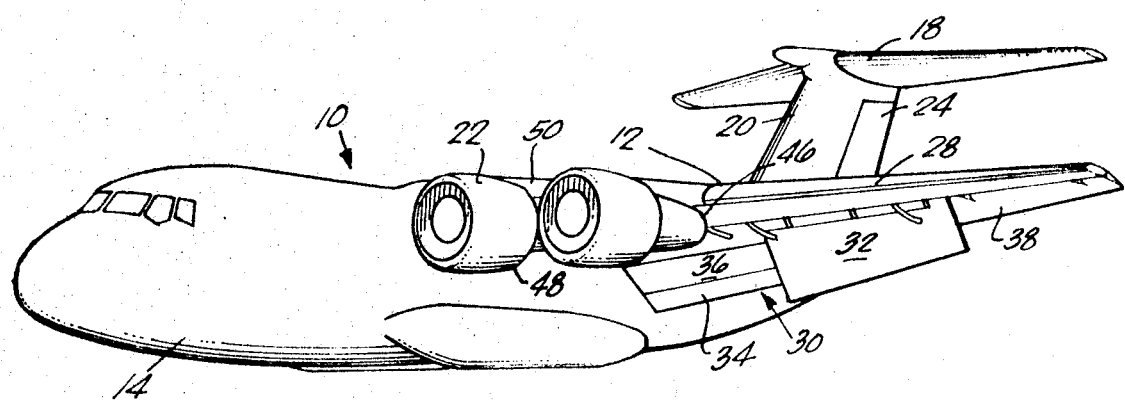
FIG. 1 is a perspective view of an aircraft with flaps down for ascent or descent operation.
Figure 2:
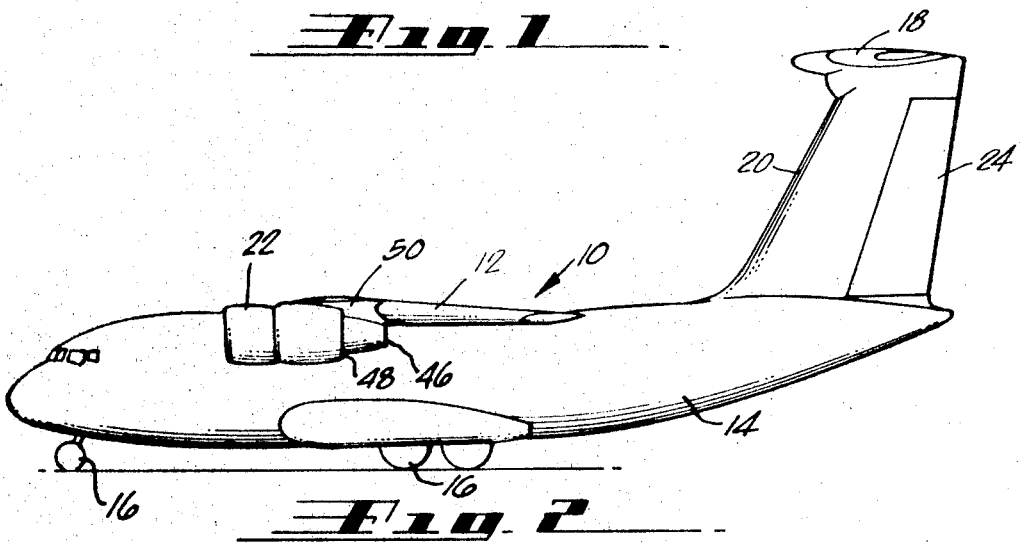
FIG. 2 is a side elevational view.
Figure 3:
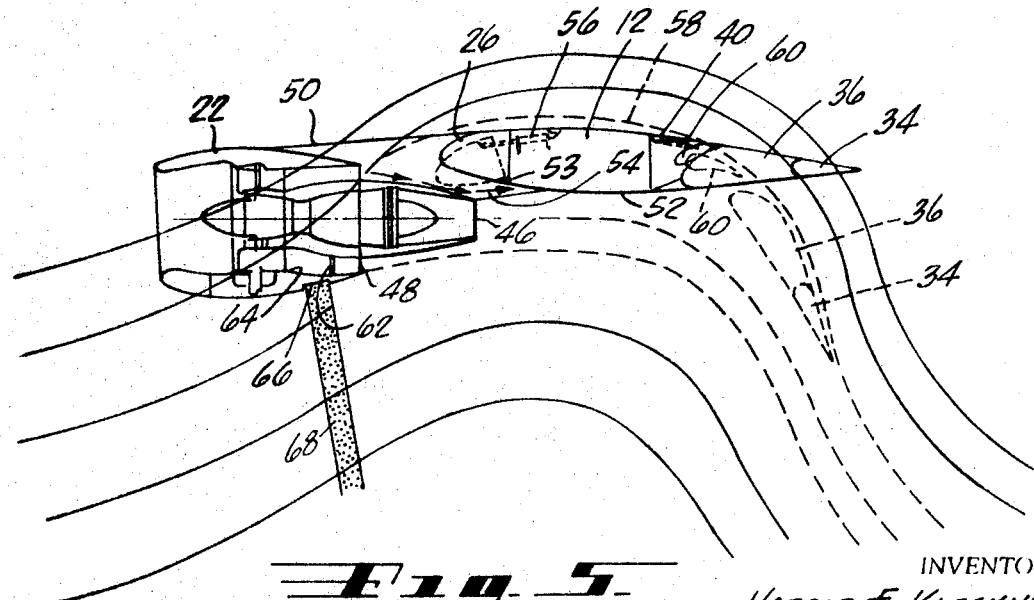
FIG. 3 is a front view.
Figure 3:
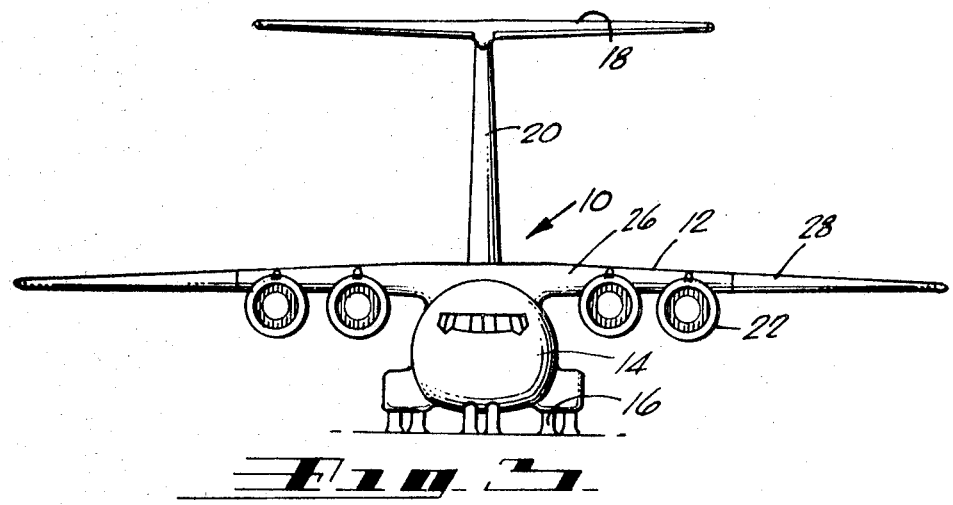
Figure 4:
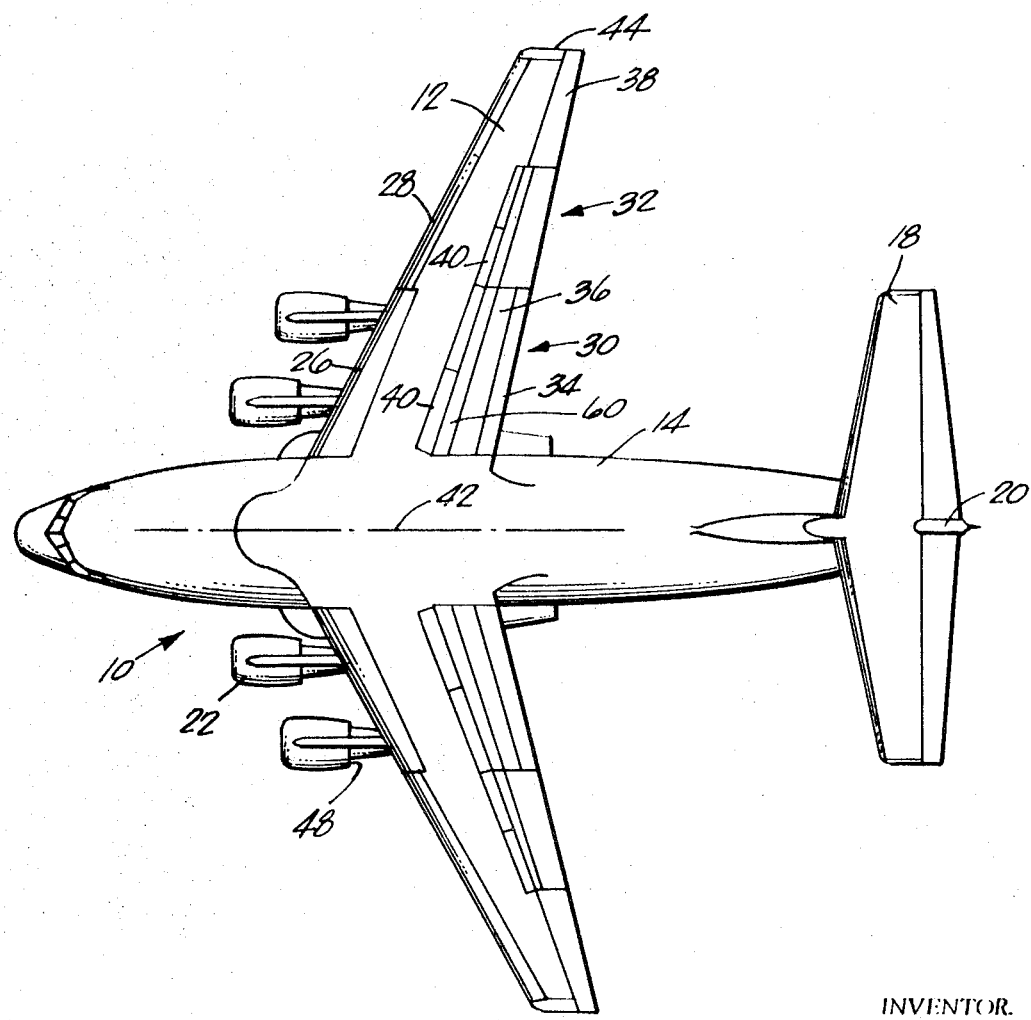
FIG. 4 is a plan view.

Referring now to FIGS. 1-4, there is shown an exemplary airplane 10 consisting of the basic elements of a wing 12, fuselage 14, landing gear 16, horizontal and vertical tails 18, 20 and four turbofan engines 22. The airplane flys in the manner of conventional airplanes with the exception of having short takeoff and landing distance capability which is attributable to its unique engine installation, wing design, and control surfaces. The wing 12 preferably has a moderate wing sweep incorporated for longitudinal stability and maximum lift. The four engines 22 are mounted two on a side as close as practicable to the fuselage 14 and to each other to minimize the lateral moment arm of the outboard engine. The horizontal and vertical tail surfaces 18, 20 are positioned on as long a moment arm as is practicable to maximize the stability and controllability obtainable from them. The horizontal tail surface or stabilizer 18 is shown placed atop the vertical tail surface or fin 20 for the same reason, although a different position might be used if desired. The horizontal tail surface 18 embodies high-lift airfoils and is designed for high lifting capability. It is suitably adjustably mounted to fin 20 for controlled movement relative thereto for varying its attitude and is equipped with leading edge slats and with usual elevators appropriately geared to the stabilizer 18.

If desired, boundary layer control with either blowing or suction may be used to further increase the lifting ability of the horizontal tail surface 18. To assist the horizontal tail surface in providing airplane trim and control, the engine installation 22 may incorporate fan air deflected downwardly which would provide a reduction in pitching moment. The vertical tail surface 20 is designed to provide a directional stabilizing affect and large yawing moments. For the latter, a large rudder 24 is used and boundary layer control may be added to increase the yawing moments for some aircraft depending upon requirements.

The engines 22 are mounted forward of the wing 12 and as close under the wing as practicable from the standpoint of the proximity of the engine primary jet to the undersurface of the wing. The fore and aft position of each engine is such that the fan section discharge opening defining a fan exit is forward of the wing leading edge device which, in this case, is a leading edge flap 26 located on the wing along the leading edge inboard. A slat may be used in lieu of the flap 26, and a slat 28 is used on the leading edge outboard. The position of each engine 22 is such that in the operation of the airplane some of the upper fan efflux from the engine will normally go over the wing with the leading edge flap 26 deflected and will go under the wing when undeflected. A portion of the upper fan efflux always goes under the wing to provide a cool air shield barrier between the wing and the primary jet exhaust.

The wing airfoil sections and flap are designed primarily for lifting capability. The wing design utilizes appropriately selected wing thickness, thickness distribution, camber and camber distribution to maximize the lift ability and to provide good stalling characteristics with minimum effect on the cruise drag. The leading edge flap 26 and slat 28, and trailing edge flaps 30, 32 are, of course, designed for maximum lift, good stalling characteristics, efficiency in turning the engine air, and practicability of retraction. In addition, an auxiliary flap 34 attached to the main flap 36 of inboard flap 30 provides a change in drag with no essential change in maximum lift. The wing trailing edge center flap 32 extends from the inboard flap 30 to the aileron 38. Depending on airplane requirements, this flap 32 could extend full span (with the outer element acting in a dual role as both flap and aileron) and may also have an auxiliary flap if desired. The aileron 38 is used for lateral control in conjunction with spoilers 40 on the wing upper surface just forward of the flaps. The spoilers 40 are used for lateral control and for direct lift control. For direct lift control, any or all spoilers may be used and their oepration may be in conjunction with elevator control or by separate control, or both, depending on detail requirements of the airplane or its mission.

The position of the turbofan engines 22 relative to the wing 12 can best be described by four restraints. The outboard engines should be inboard of 55 percent of the semispan where the semispan is defined as the dimension from the airplane centerline 42 to the wing tip 44. The engines are located chordwise on the wing that the turbine section discharge opening or primary exit openng 46, at the aft end of the engine housing, is positioned between 0 and 25 percent of the wing chord which is in the vertical plane of the engine centerline. The engines are also located chordwise on the wing so that the fan section discharge opening or fan exit opening 48 is forward of the leading edge of such wing chord. Additionally, the engines are located vertically relative to the wing so that the uppermost point of the primary exit opening 46 is within 1½ primary exit opening diameters from the lower wing surface at the vertical plane of the primary exit opening 46 but spaced from this lower wing surface a distance sufficient to permit fan efflux flow therebeneath.

The airplane operation is similar to that of conventional aircraft with certain exceptions. The most noticeable exceptions are the short takeoff and landing distances, the steeper climb-out and approach flight paths, the higher acceleration on takeoff, the high rate of climb, and the higher engine thrust used in the landing approach. The principle differences in the operation of the present airplane are outlined as follows:

1. Each inboard flap 30 (thrust deflector flap) usually will have a different (lesser) deflection than the center flaps 32 for takeoff. This relationship is to maximize the forward thrust component for a given lift capability. Each inboard flap typically is deflected 30° for takeoff and 50° for landing whereas each center flap 32 typically is deflected 60°.

2. Deflection of the spoilers 40 for direct lift control will be different (in general) than is conventional for takeoff and for the landing approach.

3. The control provided for auxiliary flaps 34 is an additional control over those used for conventional aircraft. It will be used to control the landing approach glide path and reduces the need to use the elevator and throttle controls.

4. For a waveoff from a landing approach, the conventional increase in thrust is required; and in addition with the subject airplane, a partial retraction of the inboard flaps 30 is required. This retraction may be manual or automatic depending on requirements.

5. In the event of an engine failure in the landing approach, provision is made in suitable manner for an automatic thrust increase on the adjacent engine. This provision minimizes the effect of the loss of an engine in the landing approach. For example, in landing with a 50 percent thrust output on each engine, upon failure of one engine, the thrust increase on the adjacent engine restores all but a few percent of the lift that would otherwise have been lost.

Reference is now made to FIG. 5 which is a schematic view in the plane of the engine centerline. Here is shown turbofan engine 22 mounted on wing 12 by pylon 50 and extending below and forwardly to meet the criteria set forth in this invention. The fan exit 48 is forward of the leading edge of wing 12 and the primary exit 46 is within 1½ primary exit diameters of the lower surface 52 of the wing. The location of the engine is such as to permit a portion of the fan exit air shown by arrows 54 to pass under the wing undersurface 52 to form a cool air heat shield, preventing heat damage from the primary jet exhaust from exit 46 to the aluminum skin of the wing undersurface. Insulation is normally not provided on undersurface 52 although it may be added if necessary on a particular design.

Leading edge flap 26 is pivotally attached to wing 12 at pivot point 53 and may be hydraulically actuated by cylinder 56 to deflect downwardly and thus deflect more fan air over the top of wing 12, as shown by dashed line 58. The aft portion of wing 12 includes spoilers 40, flap vane 60, main flap 36 andauxiliary flap 34. When flap vane 60 is extended the and auxiliary may be deflected trailing-edge down and there may be a gap between the spoilers and vane. Theflap vane 60 permits a greater deflection of the main flap 36 and is desirable for increased boundary layer control, as is well known. The main flap 36, which is the principal thrust deflector, is normally made of titanium with a suitable heat shield in the area behind the hot air blast from the engine primary exit 46. Auxiliary flap 34 is for drag control. It changes the drag and thus the approach glide angle of the aircraft with no essential change in maximum lift. It may be desirable to deflect fan air downwardly to reduce the horizontal tail load. A modified thrust reverser 62 in the bottom fan bypass duct 64 could be used to accomplish this with the fan exhaust flow 68 exiting through opening 66 in the housing.

Figure 6:
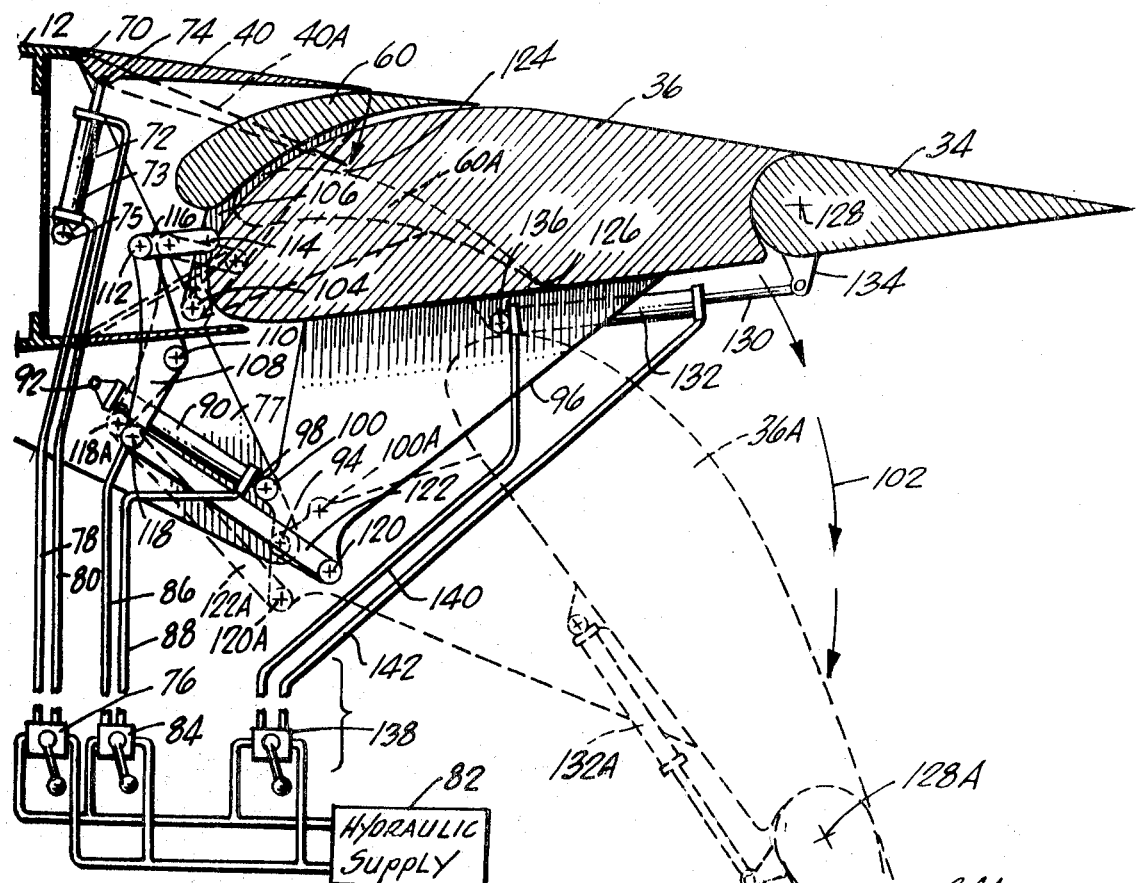
FIG. 6 is a schematic illustration of the inboard flaps in cruise and landing position.

In FIG. 6 there is shown the relationship of a spoiler 40, flap vane 60, main flap 36 and auxiliary flap 34 in normal and extended positions. The normal positions are shown in solid lines. The extended positions are shown in dashed lines with identifying numerals followed by the letter "A." Hydraulic actuation is provided although other power means may be substituted if desired. Spoiler 40 is a longitudinally extending strip pivotally connected at its forward edge 70 to the upper surface of wing 12. A hydraulic cylinder 72 is pivotally connected to the spoiler 40 at a point 74 rearwardly of point 70 for actuation of the spoiler between its normal and extended position. The other end 73 of cylinder 72 is mounted at 75 to a fixed support 77 on wing 12. Control valve 76 is associated with hydraulic passages 78, 80 to control fluid flow to and from hydraulic supply 82 to control the spoiler position.

The movement of flap vane 60 and main flap 36 are coordinated by control valve 84 in hydraulic lines 86, 88 to actuate cylinder 90. This cylinder is connected at end 92 to fixed support 77. Main flap 36 also is pivotally mounted at 94 to fixed support 77 through a support bracket 96 affixed to the main flap. Actuator 98 on cylinder 90 is pivotally mounted at point 100 on main flap support bracket 96. As hydraulic pressure in cylinder 90 extends actuator 98 to increase the distance between points 92 and 100, main flap 36 is moved in the direction of arrows 102 to its extended or dotted line position 36A.

Flap vane 60 is pivotally mounted at pivot 104 to fixed support 77 through a support bracket 106 affixed to the vane. Bellcrank 108 is also pivotally mounted at pivot 110 to fixed support 77. Bellcrank end 112 is connected to pivot point 114 on support bracket 106 by link 116. The other end 118 of bellcrank 108 is connected to pivot point 120 on main flap bracket 36 by link 122. Thus, when main flap 36 pivots clockwise about pivot 94, due to actuation of cylinder 90, link 122 causes clockwise rotation of bellcrank 108 about pivot 110, and this causes flap vane 60 to move to its extended position 60A. It should be noted that there may be an air gap 124 between spoiler 40 and flap vane 60 in their extended positions. There is also an airgap 126 between flap vane 60 and main flap 36 in their extended positions. These gaps permit air passage through the extended flap structures for boundary layer control. The flap vane 60 permits a greater extension of main flap 36 than would otherwise be possible.

The auxiliary flap 34 is pivotally affixed at 128 to main flap 36 and, when main flap 36 is in its extended position 36A, is used to control drag without materially affecting the deflected thrust or lift. Hydraulic actuator 130 in cylinder 132 is pivotally connected to bracket 134 on auxilairy flap 34 while the other end 136 of the cylinder is affixed to main flap 36. Control valve 138 in hydraulic lines 140, 142 control auxiliary flap movement between positions 34A and 34B. Position 34B can be either below or above position 34A. Double arrow 143 indicates bidirectional movement.

Figure 7:
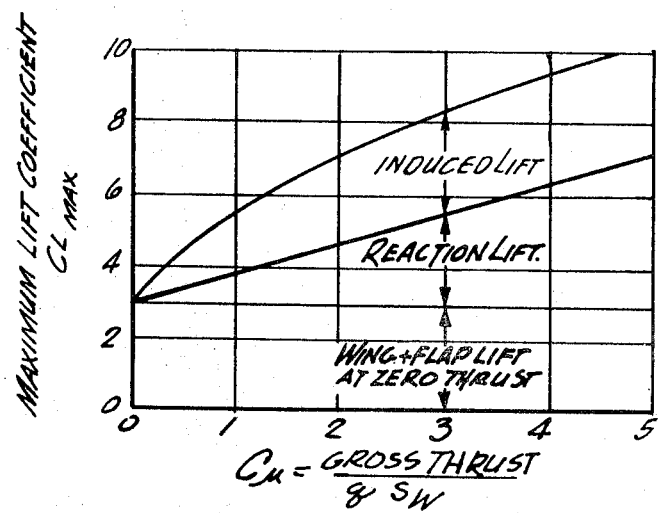
FIG. 7 is a graph showing the relationship of the various elements contributing to the high lift coefficient of the aircraft.

FIG. 7 shows the approximate lifting capability of the aircraft comprising the present invention. The lift is the sum of three parts, the basic lift of the wing and flap with no thrust deflection, the reaction lift due to thrust delfection, and the induced lift which arises from the high engine exhaust velocities in the presence of the wing. The latter two parts constitute the propulsive lift without which a STOL airplane would not be competitive. The type of presentation used in FIG. 7 is necessary to illustrate the maximum lift capability of an airplane having propulsive lift. In this kind of presentation the maximum lift is shown as a function of the gross thrust momentum coefficient, $C\mu$. This coefficient is a measure of the propulsive momentum from which propulsive lift derives. For a given $C\mu$, the higher the maximum lift, the better is the airplane lifting system in general. FIG. 7 shows that the aircraft comprising the present invention combines a high $C_{Lmax}$ wing and flap, about 3.0, with high propulsive lift from both redirected thrust (reaction lift) and additional induced lift. The $C_{L\ max}$ increases as $C\mu$ increases, i.e., as the gross thrust increases.

Having described an illsutrative embodiment of the present invention, it is to be understood that other embodiments will occur to those skilled in the art and that these modifications are to be construed as part of the present invention.

I claim:

1. A turbofan-powered STOL aircraft including in combination, a fuselage, a wing on said fuselage, said wing having leading and trailing edges and contoured upper and lower surfaces, at least one turbofan engine on said wing, said engine having discharge openings defining a fan exit and a primary exit for efflux from fan and turbine sections of said engine, said engine being positioned forwardly and downwardly on said wing whereby efflux from said primary exit passes under said wing and efflux from said fan exit passes proportionately in part over and in part under said wing, said fan efflux passing under said wing forming a heat shield between said efflux from said primary exit and the lower surface of said wing.

2. A turbofan-powered STOL aircraft as set forth in claim 1 wherein said fan exit is positioned ahead of said wing leading edge and the primary exit is within the forward 25 percent of a wing chord measured in the vertical plane of the centerline of said engine.

3. A turbofan-powered STOL aircraft as set forth in claim 1 wherein said wing has a leading edge flap to regulate the proportion of fan exit efflux flowing over and under said wing.

4. A turbofan-powered STOL aircraft as set forth in claim 1 wherein said wing has a main flap, flap vane and an auxiliary flap, said main flap being pivotally movable downwardly and angularly relative to and spaced from the rear of said wing to a deflection position to deflect fan exit and primary exit efflux from said engine downwardly and rearwardly, said flap vane being interconnected with said main flap for relative movement therewith to move into a position within the space between said rear of said wing and said main flap in said deflection position, said flap vane forming slots with said main flap and said rear of said wing and maintaining fan efflux flow over and in close proximity to said wing, flap vane and main flap.

5. A turbofan-powered STOL aircraft as in claim 1 wherein said wing has a main flap with an auxiliary flap pivotally connected therewith, means for moving said main flap rearwardly and downwardly from said wing and into the path of the rearward flow of efflux from said fan exit and primary exit to thereby deflect said efflux downwardly to generate propulsive lift.

6. A turbofan-powered STOL aircraft as in claim 1 wherein said wing has a main flap with an auxiliary flap pivotally connected therewith, means for moving said main flap and said auxiliary flap rearwardly and downwardly from said wing and into the path of the rearward flow of efflux from said primary exit, and means for moving said auxiliary flap relative to said main flap to regulate drag caused thereby without a substantial change in thrust to thereby control the glide path of said aircraft in landing.

7. A turbofan-powered STOL aircraft including in combination, a fuselage, a wing on said fuselage, said wing having leading and trailing edges and contoured upper and lower surfaces, at least one turbofan engine on said wing, said engine having discharge openings defining a fan exit and a primary exit for efflux from fan and turbine sections of said engine, said engine being positioned forwardly and downwardly on said wing, the centerline of said engine being within 55 percent of the semispan of said aircraft, said primary exit being within the forward 25 percent of a wing chord measured in the vertical plane of the centerline of said engine, said fan exit being positioned ahead of said wing leading edge in order that efflux from said primary exit passes under said wing and efflux from said fan exit passes proportionately in part over and in part under said wing, said fan efflux passing under said wing forming a heat shield between said efflux from said primary exit and the lower surface of said wing.

8. A turbofan-powered STOL aircraft including in combination, a fuselage, a wing on said fuselage, said wing having leading and trailing edges and contoured upper and lower surfaces, at least one turbofan engine on said wing, said engine having discharge openings defining a fan exit and an annular primary exit for efflux from fan and turbine sections of said engine, said engine being positioned forwardly and downwardly on said wing whereby said primary exit is within the forward 25 percent of a wing chord measured in the vertical plane of the centerline of said engine and within 1½ primary exit diameters from said lower surface of said wing, said fan exit being positioned ahead of said wing leaidng edge in order that efflux from said primary exit passes under said wing and efflux from said fan exit passes proportionately in part over and in part under said wing, saifan efflux passing under said wing forming a heat shield between said efflux from said primary exit and the lower surface of said wing.

9. In an aircraft:

a wing having leading and trailing edges and contoured upper and lower surfaces; and a turbofan reaction engine carried by said wing, said engine having discharge openings for efflux from fan and turbine sections of said engine, said openings haivng annular edges lying in first and second longitudinally spaced substantially parallel planes, said first plane including said discharge opening from said turbine section and said second plane including said discharge opening from said fan section, said second plane being positioned in forward spaced relatiionship to said leading edge of said wing, said first plane intersecting said wing within a forward 25 percent of a chord thereof in the vertical plane of the centerline of said engine, said leading edge of said wing being located in said efflux from said fan section whereby gaseous flow therefrom is delivered over said upper and lower wing surfaces.

10. In an aircraft, the combination as set forth in claim 9 wherein said leading edge has a movable flap for varying the proprotion of flow from said fan discharge opening over said upper and lower wing surfaces.

11. In an aircraft, the combination as set forth in claim 9 wherein said fan section has means therein for directing a portion of said efflux therefrom downwardly.

PO-1050
(5/69)

UNITED STATES PATENT OFFICE
CERTIFICATE OF CORRECTION

Patent No. 3,614,028        Dated 19 October 1971

Inventor(s) Harold F. Kleckner

It is certified that error appears in the above-identified patent and that said Letters Patent are hereby corrected as shown below:

In the specification, column 4, line 67, delete "and aux-"; line 68, delete "iliary" and insert --spoilers-- therefor.

Signed and sealed this 18th day of April 1972.

(SEAL)
Attest:

EDWARD M. FLETCHER, JR.
Attesting Officer

ROBERT GOTTSCHALK
Commissioner of Patents